(12) United States Patent
Petsinger et al.

(10) Patent No.: US 6,625,759 B1
(45) Date of Patent: Sep. 23, 2003

(54) METHOD AND APPARATUS FOR VERIFYING THE FINE-GRAINED CORRECTNESS OF A BEHAVIORAL MODEL OF A CENTRAL PROCESSOR UNIT

(75) Inventors: Jeremy Petsinger, Fort Collins, CO (US); Kevin David Safford, Fort Collins, CO (US); Karl P. Brummel, Fort Collins, CO (US); Russell C. Brockmann, Fort Collins, CO (US); Bruce A. Long, Loveland, CO (US); Patrick Knebel, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/502,366

(22) Filed: Feb. 18, 2000

(51) Int. Cl.[7] .................................................. H02H 3/05
(52) U.S. Cl. .............................. 714/28; 714/30; 714/34; 714/21
(58) Field of Search ................................. 714/30, 741, 28, 714/45, 37, 34, 33; 703/21, 22; 717/135

(56) References Cited

U.S. PATENT DOCUMENTS

| | | | | |
|---|---|---|---|---|
| 5,357,626 A | * | 10/1994 | Johnson et al. | 703/28 |
| 5,438,673 A | * | 8/1995 | Court et al. | 703/22 |
| 5,452,437 A | * | 9/1995 | Richey et al. | 712/25 |
| 5,475,852 A | * | 12/1995 | Yoshida et al. | 712/227 |
| 5,845,064 A | * | 12/1998 | Huggins | 714/26 |
| 5,859,962 A | * | 1/1999 | Tipon et al. | 703/21 |
| 5,859,999 A | | 1/1999 | Morris et al. | 395/565 |
| 5,860,017 A | | 1/1999 | Sharangpani et al. | 395/800.23 |
| 5,892,897 A | * | 4/1999 | Carlson et al. | 714/31 |
| 5,923,567 A | * | 7/1999 | Simunic et al. | 703/13 |

OTHER PUBLICATIONS

Wolfe, A., "Patents shed light on Merced's Innards", Electronic Engineering Times, Feb. 15, 1999.

* cited by examiner

Primary Examiner—Robert Beausoliel
Assistant Examiner—Marc Duncan

(57) ABSTRACT

A method and an apparatus checks the fine-grain correctness of a microcode machine central processor unit (CPU) behavioral model. Macroinstructions are decomposed into microinstructions and each microinstruction is executed sequentially. A sequence of microinstructions is determined by an emulated microinstruction sequencer, using dynamic execution information, including information from execution of prior microinstructions in the sequence of microinstructions. At the end of execution of each microinstruction, a reference state is compared to a corresponding state of the behavioral model, and any differences are noted. After execution of all microinstructions in the microinstruction sequence, a reference state is compared to a corresponding state of the behavioral model, and any differences are noted.

18 Claims, 3 Drawing Sheets

METHOD AND APPARATUS FOR VERIFYING THE FINE-GRAINED CORRECTNESS OF A BEHAVIORAL MODEL OF A CENTRAL PROCESSOR UNIT

TECHNICAL FIELD

The technical field is computer modeling that tests microprocessor or chip design and function.

BACKGROUND

Current computer architectural testing often involves comparing the results of instructions executed on a reference model and instructions executed on a behavioral model. A microcode based machine is one in which a user visible instruction (macroinstruction) is broken down into a sequence of microinstructions that emulate the behavior of the macroinstruction, and are not directly visible to the user. On a microcode based machine, such testing is completed without microinstruction modeling or checking. Because current systems do not include modeling on the microinstruction level, current systems are only capable of checking the behavioral model on the macroinstruction boundaries in the emulated instruction set, or on transitions between the microinstruction set and native mode instruction set. In addition, current systems have not been able to verify the correctness of the microinstruction sequence and control (aliasing) information. Furthermore, current microcode simulators can only execute microinstructions without faults or traps, or other dynamic information. These simulators were designed for performance analysis rather than checking correctness.

SUMMARY

A method and apparatus for verifying the fine-granularity correctness of a behavioral model of a microcode machine central processing unit (CPU) that supports two instruction set architectures, where applications written for either instruction set architecture may be executed on the CPU. In computer systems, granularity may refer to how finely instructions executing on the CPU may be tested. That is, a fine granularity test may involve observing and recording the result of each specific action that the CPU completes in performing a function. Verifying a CPU on a finer granularity allows the designer to detect and isolate errors in the design more quickly. Additionally, finer-grained checking can detect incorrect behavior that may not be available with coarse-grained checking.

The two instruction set architectures may use a native mode instruction set and an emulated mode instruction set. In order to preserve compatibility with software applications that have been written to use the emulated instruction set without requiring the user to convert the software to the native mode instruction set, the designer causes the CPU to switch between the native mode instruction set and the emulated mode instruction set. Instructions in an emulated mode instruction set (or macroinstructions) are broken into a series of operations comprising instructions in a native instruction set (microinstructions, or microcode). The sequence of microcode is then executed, and the behavior of the CPU is reported and checked for correctness after each microinstruction is processed.

In order to verify the fine-grained correctness of a microcode based machine, the designer must be able to generate the sequence of microinstructions (microcode) needed to emulate the macroinstruction. The sequence of microcode for a given macroinstruction depends on dynamic execution information, and generally can not be statically predicted.

DESCRIPTION OF THE DRAWINGS

The detailed description will refer to the following drawings, in which like numerals refer to like objects, and in which.

DETAILED DESCRIPTION

A new electronic device design usually includes testing to verify that the device functions as intended. This is particularly true for electronic devices comprising digital logic circuitry. Because the number of digital logic variables can be large and because each variable can exist in a number of states, the possible combinations and permutations of conditions for a digital logic circuit can be large. This is especially true for complex digital logic circuits, such as processors (including, for example, general purpose microprocessors, mathematical processors or coprocessors, digital signal processors, or other special purpose processors, controllers, microcontrollers, or microprocessors), which, accordingly, present challenges for testing and verification.

Figure 1:
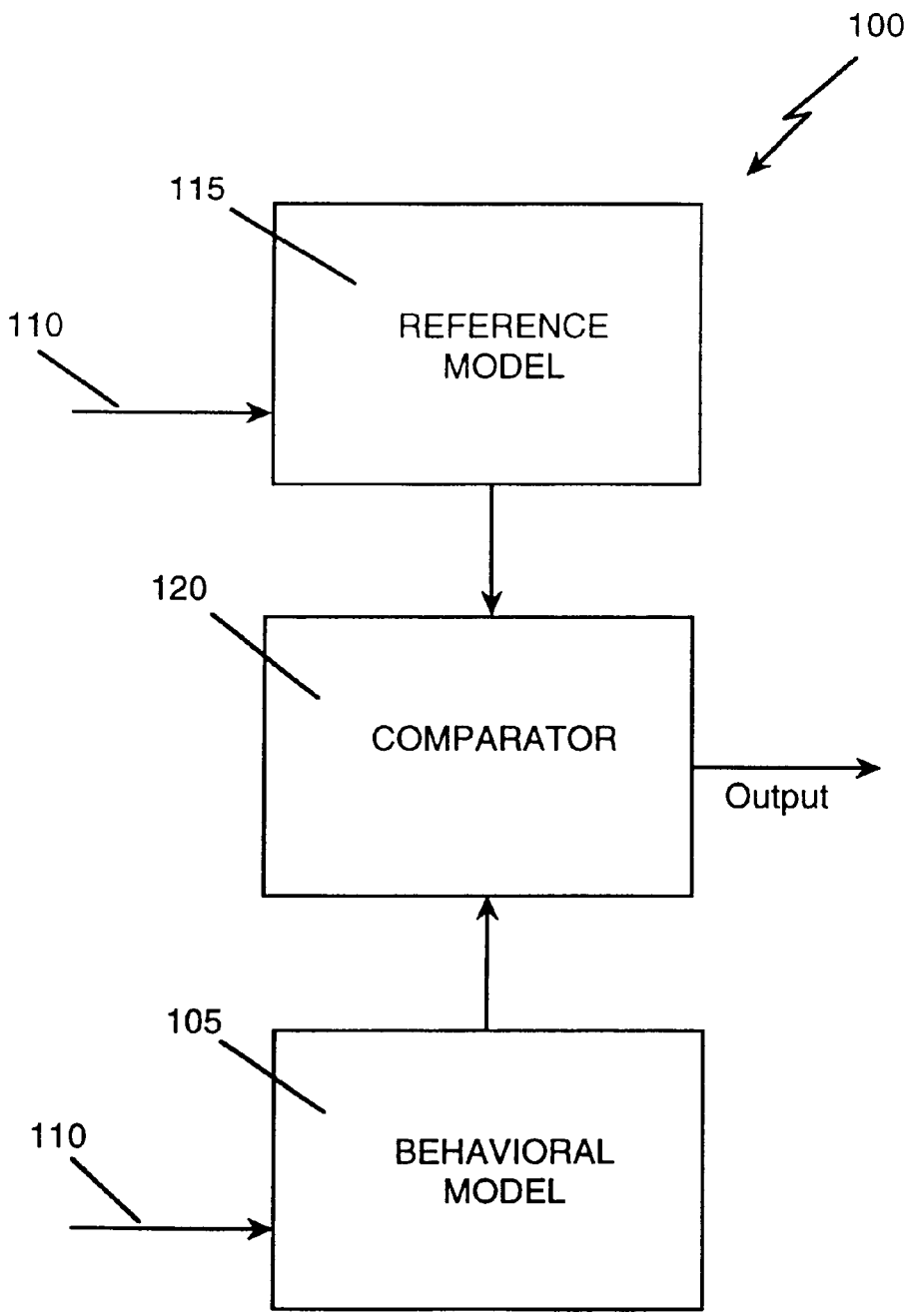
FIG. 1 is a block diagram of a general model for testing a digital logic device.

An arrangement 100 for testing a design of a digital logic device (e.g., a processor) is illustrated in FIG. 1. Rather than testing the actual hardware device, the arrangement 100 may test the design of the digital logic device using software models and emulations. A device model 105 is an accurate and detailed model of the actual hardware device. The device model (behavioral model) 105 may be expressed in a hardware description language (HDL), such as VHDL or Verilog, for example, both of which are known in the art. Test vectors 110 are applied to the device model 105. For testing a CPU, the test vectors 110 are code sequences such as programs, or portions of programs intended to run on the CPU. The test vectors 110 may include internal digital variable values that place the device model 105 into a known initialized state. The test vectors 110 are also applied to a device emulator (reference model) 115, which is a simplified functional model of the hardware embodiment of the digital logic device. The reference model 115 may be a software program written in C language, for example. The reference model 115 differs from the device model 105 in that the device model 105 is a close approximation to the actual hardware embodiment of the digital logic device, whereas the reference model 115 represents only the functionality of the digital logic device, as ideally envisioned by the device designer. The reference model 115 executes both macroinstructions and native mode instructions.

With a predetermined initial condition set by the test vectors 110, both the device model 105 and the reference model 115 are simulated in operation. A comparator 120 receives outputs of the device model 105 and the reference model 115, noting any differences. If differences are present, then the device model 105 has not performed as intended, and the design of the digital logic device may be modified.

Figure 2:
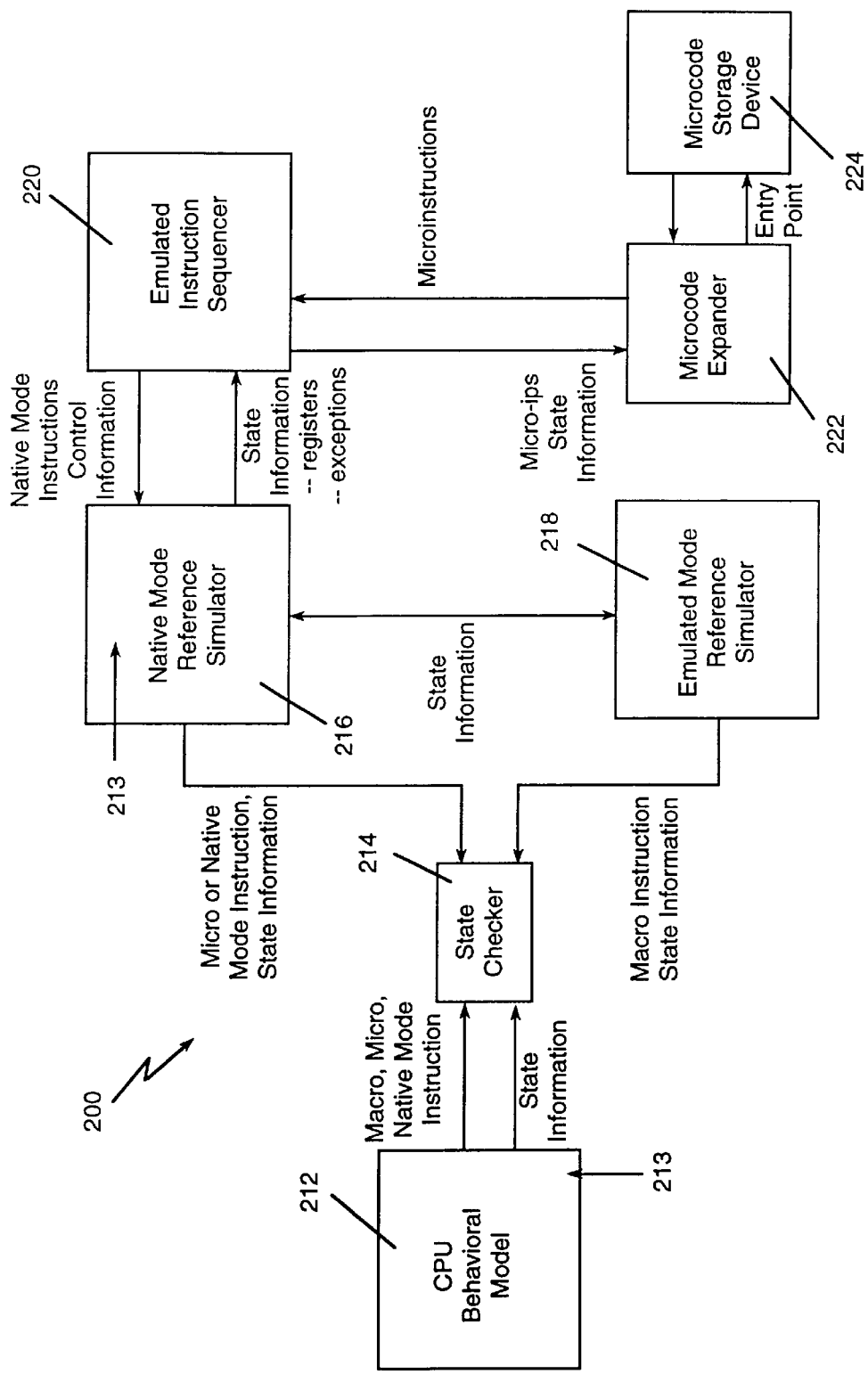
FIG. 2 is a block diagram showing the components used to verify microinstructions.

FIG. 2 is a more detailed block diagram of a mechanism 200 that may be used to verify correct operation of a CPU behavioral model 212 at the microinstruction level. The behavioral model 212 may be a chip, the physical (hardware) implementation of a CPU, or hardware description language HDL, for example. Other components of the mechanism 200 include a state checker 214, a native mode reference simulator 216, an emulated mode reference simulator 218, an emulated instruction sequencer 220, a microcode expander 222, and a microcode storage device 224.

The mechanism 200 supports two modes of architectural checking while executing instructions in the emulated instruction set. A first mode compares an emulated instruction set architectural state between the CPU behavioral model 212 and the reference model at macroinstruction boundaries (i.e., at the completion of a macroinstruction). A second mode compares an entire native mode architectural state at microinstruction boundaries.

The CPU behavioral model 212 provides event information and state information. The event information includes macroinstructions and microinstructions in emulated instruction set mode, and native mode instructions in native instruction set mode. The state checker 214 compares outputs from the native mode reference simulator 216 and the emulated mode reference simulator 218 with state information from the CPU behavioral model 212. The native mode reference simulator 216 executes a sequence of instructions and provides state information. For example, the native mode reference simulator 216 executes a sequence of microinstructions, and provides state information after the execution of each microinstruction of the sequence. The emulated mode reference simulator 218 checks the results of each emulated macroinstruction. That is, the emulated mode reference simulator 218 compares the result of each macroinstruction against the CPU behavioral model 212. Both the CPU behavioral model 212 and the native mode reference simulator 216 receive input test vectors 213 so that both the behavioral and reference models are given the same initial conditions.

The emulated instruction sequencer 220, microcode expander 222 and microcode storage device 224 convert macroinstructions into a sequence of microinstructions based on dynamic execution information. The emulated instruction sequencer 220 may be implemented as a high-level abstraction of an emulated instruction sequencer in the emulated instruction set hardware of the CPU behavioral model 212. Given state information from the execution of a microinstruction, the emulated instruction sequencer 220 determines the next operation in the sequence of microinstructions that must be executed to complete the macroinstruction. For example, the emulated instruction sequencer 220 may determine that the next operation is to take an exception, handle a microjump, end the macroinstruction, or continue to the next microinstruction. As a further example, if a microinstruction is a floating point instruction, and a numeric exception is generated, the CPU may generate an exception when the CPU attempts to execute the floating point instruction. Thus, which particular microinstruction the emulated instruction sequencer designates cannot be statically predicted since state information may affect the choice of microinstructions to execute next. As yet another example, microinstructions can generate native mode faults and may invoke a special microcode handler. The microcode handler sets a native mode instruction set and transitions to the native mode instructions set. Similarly, a microinstruction can invoke a microcode assist in response to a specific microinstruction result (e.g., a masked floating point exception). Both of these last two events may cause the emulated instruction sequencer 220 to produce a different sequence of microinstructions, based on dynamic information.

Microinstructions include the native instruction to be executed as well as a variety of control information. The microcode expander 222, which is operably coupled to the emulated instruction sequencer 220, is used to generate the microinstructions. The microcode expander 222 directly reads a model of the microcode storage device 224, which contains the encodings of the microinstructions. Based on macroinstruction information, alias fields within the microinstruction are filled in to create an instruction that can be executed on the native mode reference simulator 216.

The native mode reference simulator 216 takes inputs from the emulated instruction sequencer 220 and then provides the results of the microinstruction execution. The native mode reference simulator 216 maintains architectural state information for both the native and emulated instruction sets. The native mode reference simulator 216 is capable of executing both microinstructions and normal native instructions.

The emulated mode reference simulator 218 executes the emulated instruction on macroinstruction completion. The emulated mode reference simulator 218 compares the result against the sequence of microinstructions generated by the mechanisms 216, 220, 222 and 224.

The mechanisms 216, 220, 222 and 224 enhance the designer's ability to develop microcode by modeling dynamic events and directly generating microcode entry points into the microcode storage device 224. This provides a one-to-one correspondence between the reference model and the CPU behavioral model 212. Additionally, using the emulated mode reference simulator 218 to verify a sequence of microinstructions correctly emulates the macroinstructions allows microcode to be developed and tested in a standalone environment that is independent of the CPU behavioral model 212.

Finally, the mechanism 200 allows the designer to observe breakpoints after microinstructions. This allows the designer to observe the native mode architectural state during execution of an emulated instruction.

Figure 3:
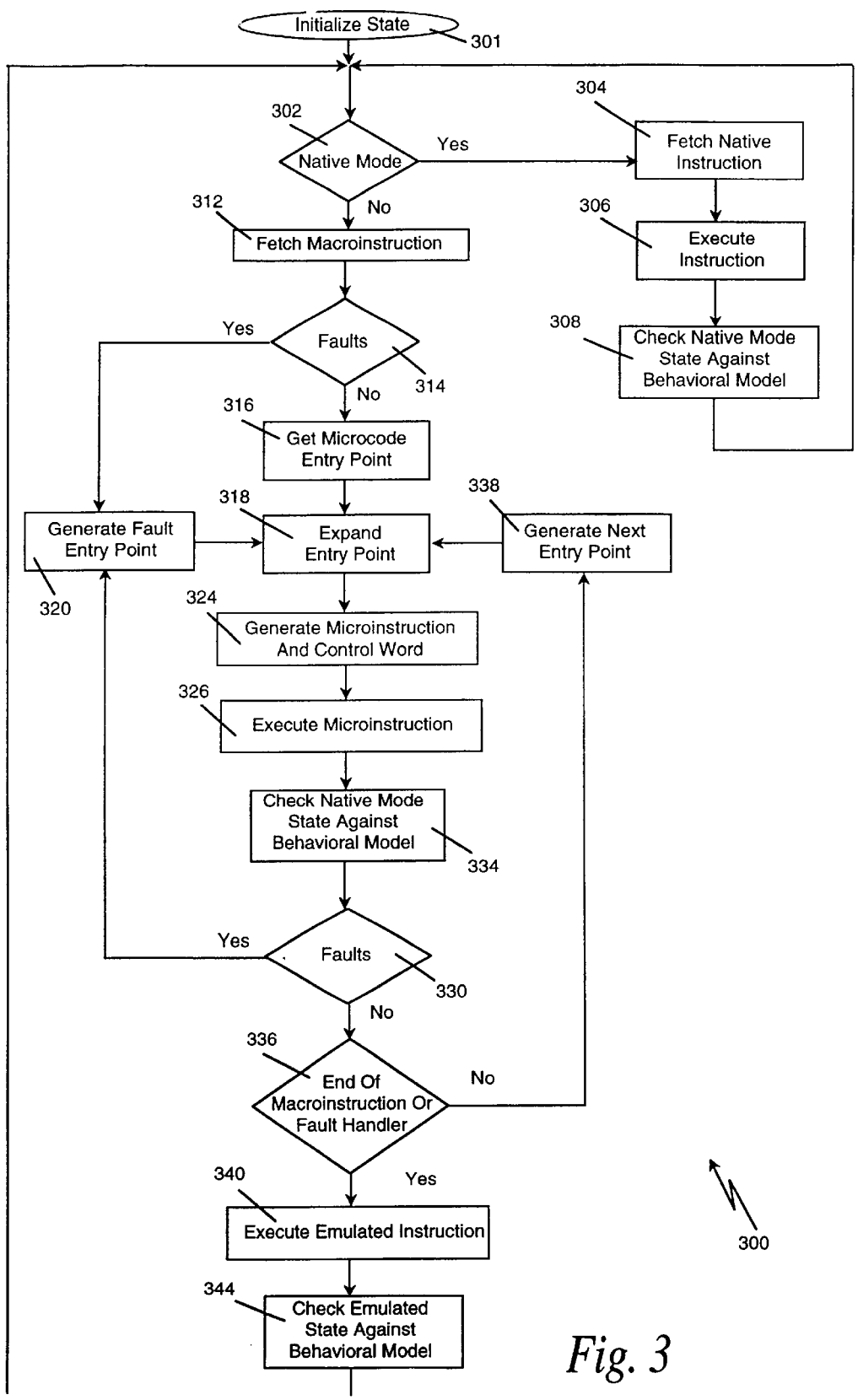
FIG. 3 is a flow diagram illustrating the process carried out by the components shown in FIG. 2.

Operation of the system will now be explained with reference to the flow chart 300 shown in FIG. 3. Processing begins by initializing the native mode reference simulator 216 and the emulated mode reference simulator 218, block 301, and transitions to block 302, where the instruction set mode is checked. If the code is in the native mode, the mechanism 200 transitions to a fetch native instruction block 304, and the native mode instruction is fetched (read) from memory. In execute instruction block 306, the mechanism 200 executes the native instruction and moves to check state block 308. In block 308, the mechanism 200, using the state checker 214, checks the native mode state against the CPU behavioral model 212 and returns to step 302.

In step 302, if the instruction is not a native mode instruction, the macroinstruction bytes are fetched from memory, block 312. Next, the macroinstruction fetch (memory read) related faults are detected, block 314. If the test shows no faults, the microcode entry point for the macroinstructions is determined, block 316. The emulated instruction sequencer 220 decodes the instruction and generates an entry point into the microcode storage device 224. The entry point is the location in the microcode storage device 224 that marks a beginning of a sequence of microinstructions that make up a given macroinstruction.

In expand entry point block 318, the entry point and the macroinstruction bytes are passed to the microcode expander 222. The microcode expander 222 reads the microcode storage device 224, fills in the microinstruction's alias fields, such as operand or address size, based on the macroinstruction, and generates a control word and one or more microinstructions, block 324.

In block 314, if the test for faults in the microcode indicate the presence of one or more faults, a fault entry point into the microcode is determined, block 320. The mechanism 200 continues to the expand entry point block 318, and processing continues as before.

In block 326, the native mode microinstruction is executed on the native mode simulator 216. The native mode state is then checked against the behavioral model, block 334, using the state checker 214. Any fault or control changes are reported back to the emulated instruction sequencer 220. If any faults were generated, block 330, processing returns to block 320 to generate a fault entry point into the microcode. If no faults were generated, processing moves to block 336.

If the executed native mode microinstruction is not the last microinstruction in a macroinstruction, block 336, the process moves to generate next entry point block 338, and a next microcode entry point into the microcode storage device 224 is generated. If the microinstruction just executed represents a last microinstruction (i.e., the last microinstruction that comprises the emulated macroinstruction), as indicated by an end of macroinstruction marker in the microcode storage device 224, the mechanism 200 moves to block 340 where the emulated instruction is executed on the native mode reference simulator 216. The state of the CPU behavioral model 212 is then compared with the reference emulated instruction set model 218, using the state checker 214, and any differences are reported, block 344. The process 300 then repeats, starting at block 302.

Simulating microinstructions and checking the CPU behavioral model 212 at the microinstruction boundaries has two main advantages. The method allows finer-grained checking of the CPU behavioral model 212. By independently generating and executing the same sequence of microinstructions as the CPU behavioral model 212, the reference model can check an architectural state after each microinstruction rather than waiting until the end of the emulated macroinstruction to check the architectural state. Some macroinstruction flows can be very long, e.g., several hundred microinstructions. This allows faster and more accurate identification of deviations between the CPU behavioral model 212 and the reference model. The method also allows identification of differences that are not made architecturally visible on the macroinstruction level, such as aliasing problems.

For example, the macroinstruction:
    add mem16, reg performs the operation:
    Dest←Dest +Src
If Dest (destination) is a memory location specified by a base and an offset, and Src is a register, then the macroinstruction may be broken down into the following sequence of microinstructions:
    add mem16, reg

```
r1 = generate_address (base, offset)
r2 = mem2[r1]           # read 2 bytes from memory
                        from the address in r1
r2 = r2 + reg
mem2[r1] = r2           # store 2 bytes to memory
                        in the address in r1
```

By independently generating the sequence of microinstructions in the emulated instruction sequencer 220, the mechanism 200 is able to check that the CPU behavioral model 212 executes the correct sequence of microinstructions, and is able to check the individual result of each microinstruction. For example, if the CPU behavioral model's control logic incorrectly generated a load size of four bytes instead of two bytes, the error would be signaled immediately. Were the CPU behavioral model only to be checked at macroinstruction boundaries, the error may not be detected. Similarly, if the load returned wrong data in the CPU behavioral model, such an error would be detected following execution of the load microinstruction, but at the macroinstruction level, it would be difficult to determine which microinstruction caused the error.

The method also allows microcode development including both instruction execution and fault behavior in the absence of a behavioral model, which is not available with current methods. By including macroinstruction execution, the emulated instruction set reference model 218 is able to verify the correctness of the microinstruction sequence. In addition, generating and executing the microcode on the reference model is significantly faster than doing so on a behavioral model. This allows for faster microcode development, or development in an environment where the behavioral model is incomplete or not functionally correct.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for testing a function in a microcode machine with a reference model, comprising:

reading a macroinstruction from memory;

determining a microcode storage device entry point for the macroinstruction;

generating a microinstruction sequence based on the macroinstruction;

executing a first microinstruction in the microinstruction sequence on the reference model; and comparing a state of the microcode machine to a state determined by the execution of the first microinstruction on the reference model, wherein the microinstruction sequence is generated by an emulated instruction sequencer and the first microinstruction is executed on a native mode simulator, wherein the native mode simulator reports faults and state or control changes to the emulated instruction sequencer, and wherein the emulated instruction sequencer determines a subsequent microinstruction for execution based on one or more of the faults and the state or control changes.

2. The method of claim 1, further comprising:

executing a subsequent microinstruction in the microinstruction sequence on the reference model;

comparing a state of the microcode machine to a state determined by the execution of the subsequent microinstruction on the reference model;

repeating the executing and comparing steps until all microinstructions in the microinstruction sequence are executed and all subsequent states are compared to the microcode machine;

executing the macroinstruction on the reference model, wherein the execution on the reference model produces an emulated state; and comparing the emulated state to a state of the microcode machine.

3. The method of claim 2, wherein the step of determining the microinstruction sequence comprises determining dynamic execution information.

4. The method of claim 3, wherein the dynamic execution information includes one or more of faults, traps and exceptions.

5. The method of claim 1, wherein the microcode machine comprises a central processor unit (CPU) behavioral model.

6. The method of claim 1, wherein the reference model verifies the sequence of microinstructions correctly emulates the macroinstruction independent of a CPU behavioral model.

7. The method of claim 1, wherein the microcode machine comprises a CPU behavioral model, and wherein the reference model is independent of the CPU behavioral model.

8. The method of claim 1, wherein the step of determining the microcode storage device entry point comprises decoding the macroinstruction.

9. The method of claim 1, further comprising, after determining the microcode entry point:
   reading the microcode storage device;
   generating alias information based on the macroinstruction; and
   generating a control word.

10. The method of claim 1, further comprising:
    setting microinstruction breakpoints in the microinstruction sequence; and
    observing a native mode architectural state during execution of the macroinstruction.

11. A method for testing a behavioral model of a digital device, comprising:
    providing a macroinstruction for execution by the behavioral model and a reference model;
    expanding the macroinstruction into a first microinstruction;
    executing the first microinstruction on the reference model, the execution producing a first state; and
    comparing the first state to a corresponding state of the behavioral model, wherein the first microinstruction is generated by an emulated instruction sequencer and executed on a native mode simulator, wherein the native mode simulator reports faults and state or control changes to the emulated instruction sequencer, and wherein the emulated instruction sequencer determines a subsequent microinstruction for execution based on one or more of the faults and the state or control changes.

12. The method of claim 11, further comprising:
    generating a second microinstruction;
    executing the second microinstruction on the reference model, the execution producing a second state;
    comparing the second state to a corresponding state of the behavioral model; and
    repeating the steps of generating and executing microinstructions, and comparing states, until all microinstructions comprising the macroinstruction are executed and the states compared.

13. The method of claim 11, wherein generation of microinstructions subsequent to execution of a prior microinstruction is based on dynamic execution information resulting from execution of the prior microinstruction.

14. The method of claim 11, further comprising:
    executing the macroinstruction on the reference model, wherein the execution on the reference model produces an emulated state; and
    comparing the emulated state to a corresponding state of the behavioral model.

15. The method of claim 11, further comprising:
    reading a native mode instruction set instruction;
    executing the native mode instruction set instruction on the reference model, the execution producing a reference state; and
    comparing the reference state to a corresponding state of the behavioral model.

16. An apparatus for testing a function on a microcode machine with a reference model, comprising:
    a microcode storage device that comprises microcode corresponding to microinstructions;
    a microcode expander coupled to the microcode storage device that generates a microcode entry point and reads microcode from the microcode storage device and generates microinstructions; and
    an emulated instruction sequencer coupled to the microcode expander that generates a microinstruction sequence based on state information of the microcode machine, wherein, the microinstruction sequence is executed and a state of the microcode machine is determined, wherein the microinstruction sequence is generated by an emulated instruction sequencer and executed on a native mode simulator, wherein the native mode simulator reports faults and state or control chances to the emulated instruction sequencer, and wherein the emulated instruction sequencer determines a subsequent microinstruction for execution based on one or more of the faults and the state or control changes.

17. The apparatus of claim 16, wherein the microcode machine comprises a CPU behavioral model.

18. The apparatus of claim 16, wherein the reference model is independent of a CPU behavioral model.

* * * * *